United States Patent [19]
Christopher

[11] Patent Number: 5,263,018
[45] Date of Patent: Nov. 16, 1993

[54] APPARATUS FOR TIME DIVISION MULTIPLEXED PROCESSING OF PLURAL QAM SIGNALS

[75] Inventor: Lauren A. Christopher, Indianapolis, Ind.

[73] Assignee: Thomson Consumer Electronics, Inc., Indianapolis, Ind.

[21] Appl. No.: 922,104

[22] Filed: Jul. 29, 1992

[51] Int. Cl.$^5$ .......................... H04J 11/00; H04J 3/04; H04N 7/08

[52] U.S. Cl. ...................... 370/20; 370/112; 375/15; 358/141

[58] Field of Search ................ 370/20, 49.5, 50, 69.1, 370/77, 112; 358/11, 12, 141; 375/39, 11-15

[56] References Cited

U.S. PATENT DOCUMENTS

| | | | |
|---|---|---|---|
| 4,800,573 | 1/1989 | Cupo | 370/69.1 |
| 4,918,718 | 4/1990 | Emmons et al. | 358/53 |
| 4,961,206 | 10/1990 | Tomlinson | 375/39 |
| 5,057,786 | 10/1991 | Yoshikawa | 375/39 |
| 5,122,875 | 6/1992 | Raychaudhuri et al. | 358/141 |
| 5,168,507 | 12/1992 | Critchlow et al. | 375/13 |

OTHER PUBLICATIONS

Digital Communication by E. A. Lee & D. G. Messerschmitt, pp. 553-554, 1988, Kluwer Publishers, Boston, Mass., USA.

A VLSI Architecture for a High Speed All-Digital Quadrature Modulator and Demodulator for Digital Radio Applications, by Henry Samueli, IEEE Journal on Selected Areas in Communications, vol. 3, No. 8, Oct. 1990, pp. 1512-1519.

*Primary Examiner*—Douglas W. Olms
*Assistant Examiner*—Hassan Kizou
*Attorney, Agent, or Firm*—Joseph S. Tripoli; Eric P. Herrmann; Ronald H. Kurdyla

[57] ABSTRACT

The present invention includes apparatus for processing harmonically related plural quadrature amplitude modulated carriers. Sampling apparatus converts the plural modulated carriers signal to sampled data format. The signal is sampled at a frequency equal to four times the symbol rate of the highest frequency carrier such that alternate samples correspond to in-phase and quadrature-phase components of the signal. The sampled data signals are resampled to separate respective in-phase and quadrature-phase components of the respective signals. The in-phase samples of the respective signals are time division multiplexed, and the quadrature-phase samples are time division multiplexed. The time division multiplexed in-phase samples and quadrature-phase samples are coupled to a phase correction apparatus arranged to operate in a time division multiplexed manner.

9 Claims, 6 Drawing Sheets ial 5,263,018

APPARATUS FOR TIME DIVISION MULTIPLEXED PROCESSING OF PLURAL QAM SIGNALS

This invention relates to apparatus for time multiplexed processing of frequency multiplexed quadrature amplitude modulated (QAM) signals.

BACKGROUND OF THE INVENTION

The invention will be described in the environment of an advanced definition television receiver (ADTV) of the type for processing HDTV signals proposed by the Advanced Television Research Consortium (ATRC), however it is to be understood that practice of the invention is not limited to such systems, but is applicable to other systems having harmonically related amplitude modulated carriers.

FIG. 1 illustrates a television signal in the ADTV system format. This signal is constrained to have a 6 MHz bandwidth in conformance with NTSC standards. Unlike NTSC television signal however, the ADTV signal consists of two quadrature amplitude modulated carriers, one of which is located in the lower one quarter of the 6 MHz channel space and the other which is located in the upper three quarters of the 6 MHz channel space. The upper carrier has a bandwidth which is four times as wide as the bandwidth of the lower carrier. The upper carrier frequency is exactly four times the lower carrier frequency (related to a predetermined reference). In the FIG. 1 example both carriers are modulated 16 QAM.

FIG. 2 illustrates a portion of a typical ADTV receiver apparatus including the tuner IF and QAM demodulation circuitry. A detailed description of this apparatus will not be herein provided but may be found in U.S. patent application Ser. No. 650,329 filed Feb. 4, 1991. What is to be noted however, is the parallel processing circuitry (elements 118, 120, 122, 124, 126, 128, and elements 119, 121, 123, 125, 127, and 129) for processing the two QAM signals respectively. Each of these parallel processing paths consist of relative large and complex, and therefore expensive hardware. The present invention is directed toward reducing such parallel hardware, in order to make such a system affordable to the typical consumer. More particularly the invention is directed toward utilizing processing apparatus in time division multiplexed fashion to eliminate at least a portion of the parallel processing circuitry utilized to process frequency division multiplexed signals such as the two QAM signals illustrated in FIG. 1.

SUMMARY OF THE INVENTION

The present invention includes apparatus for processing harmonically related plural quadrature amplitude modulated carriers. Sampling apparatus converts the plural modulated carriers signal to sampled data format. The signal is sampled at a frequency equal to four times the symbol rate of the highest frequency carrier such that alternate samples correspond to in-phase and quadrature-phase components of the signal. The sampled data signals are resampled to separate respective in-phase and quadrature-phase components of the respective signals. The in-phase samples of the respective signals are time division multiplexed, and the quadrature-phase samples are time division multiplexed. The time division multiplexed in-phase samples and quadrature-phase samples are coupled to a phase correction apparatus arranged to operate in a time division multiplexed manner.

DETAILED DESCRIPTION

Figure 1:
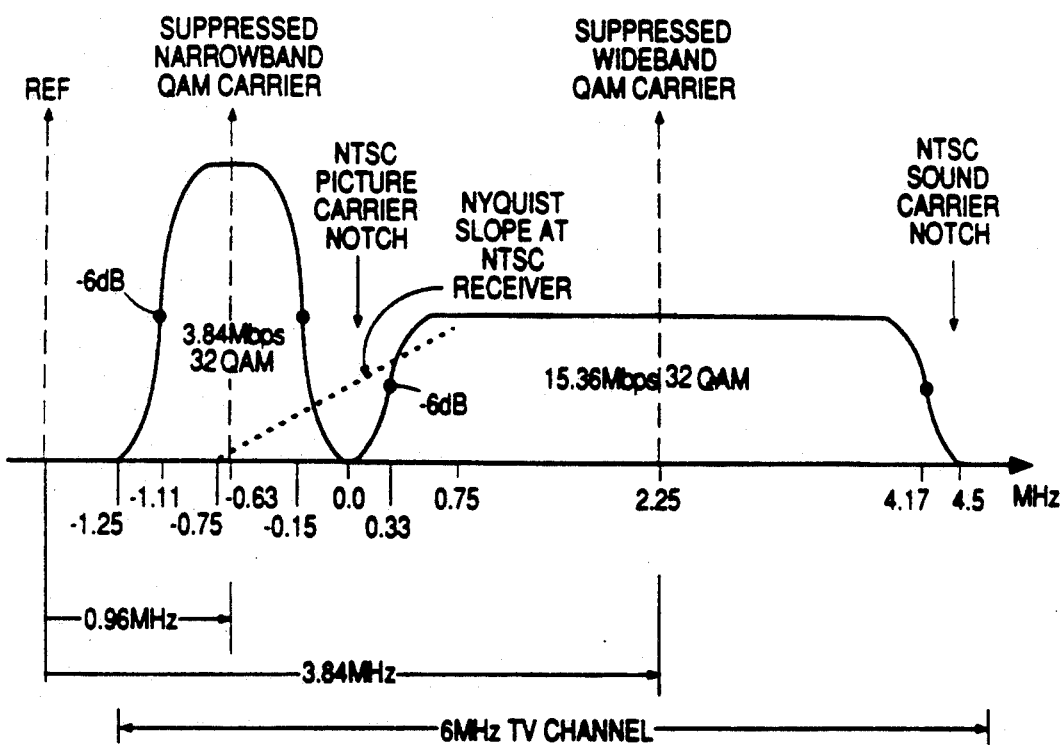
FIG. 1 is a graphical representation of the spectrum of an ADTV signal.
Figure 2:
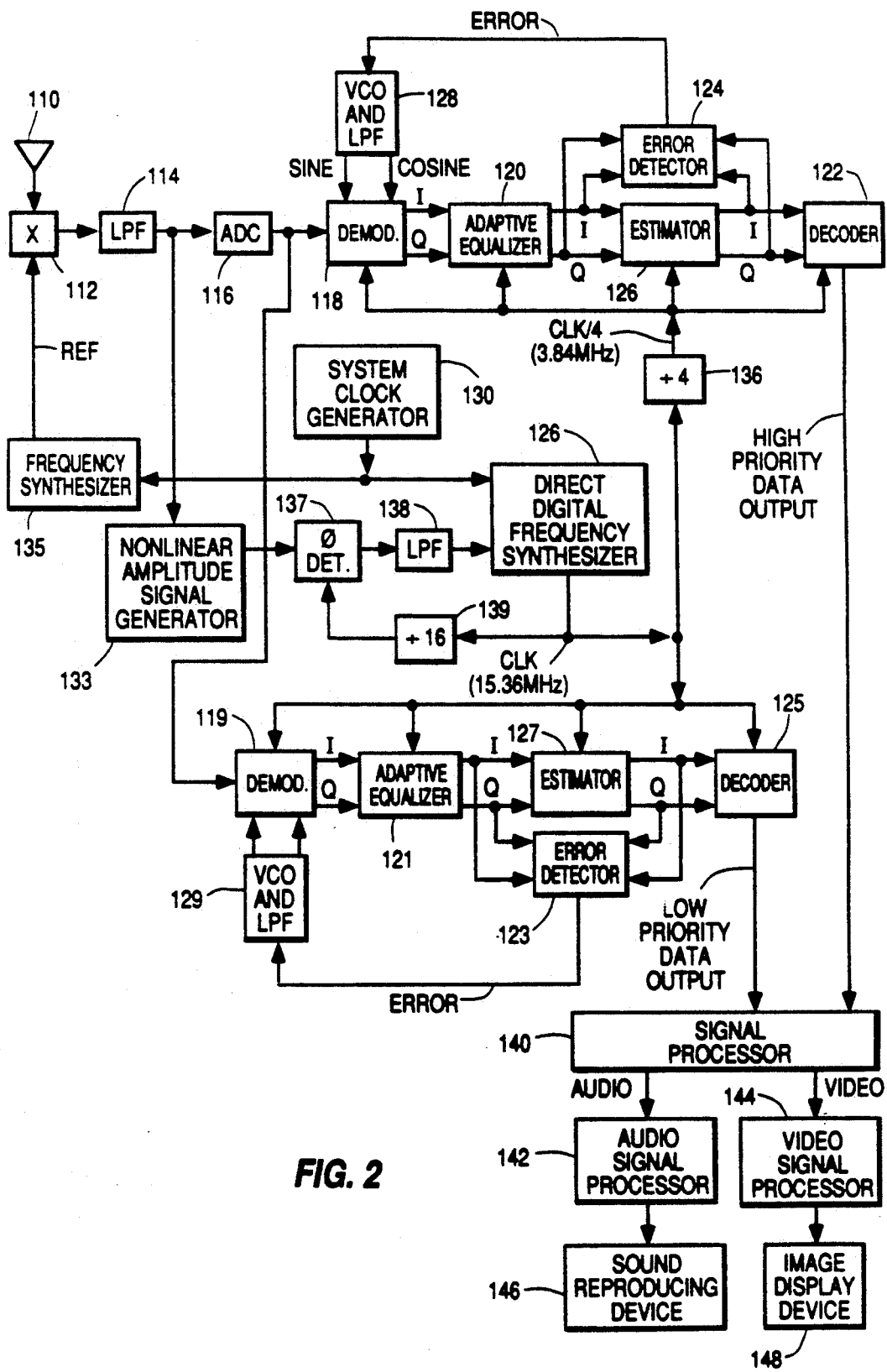
FIG. 2 is a block diagram of a portion of an ADTV receiver including the tuner and QAM demodulation circuitry.
Figure 3:
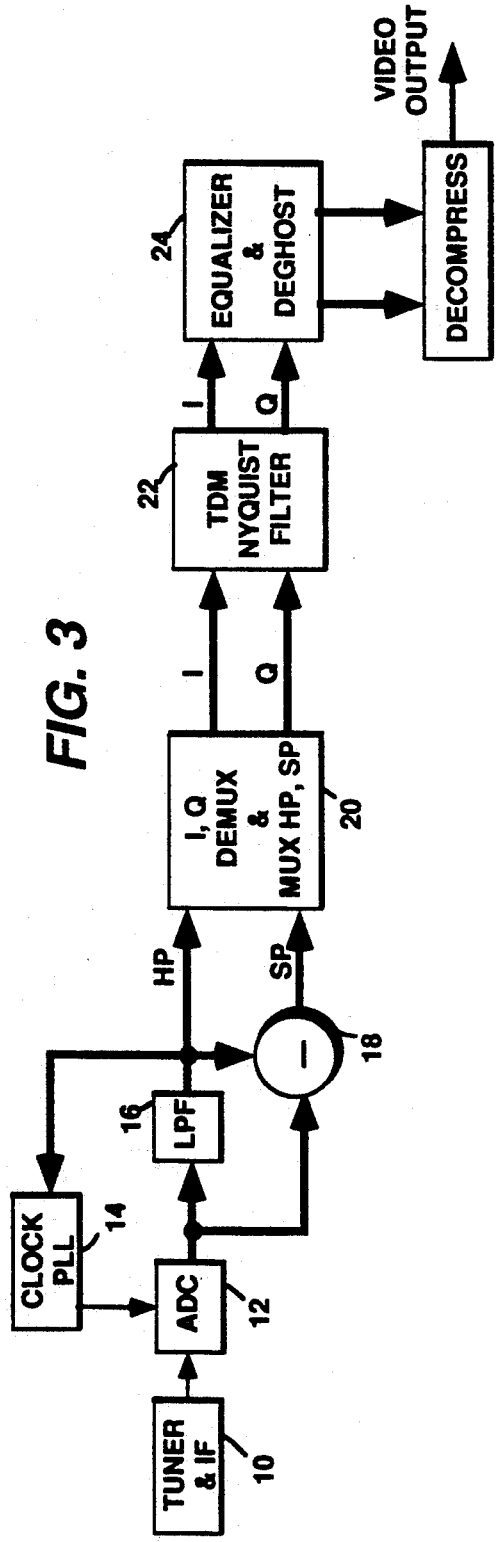
FIG. 3 is a block diagram of circuitry for processing plural QAM signals in a time division multiplexed embodying the present invention.

Refer to FIG. 3 which illustrates a portion of a more cost effective ADTV receiver. In FIG. 3, a broadcast signal having the spectral characteristics of the signal illustrated in FIG. 1 is applied to the tuner/IF circuitry 10. The local oscillator in the IF stage is selected to down convert the center of the SP channel to the SP channel's symbol rate. The IF frequency is chosen to be 43.5 MHz, which places the center of the baseband SP channel at 3.84 MHz. The down converted ADTV signal is applied to an analog-to-digital converter (ADC) 12. The ADC 12 is clocked at a rate of four times the SP channel's symbol rate or 15.36 MHz. The sampling clock applied to the ADC (and the other system clocks) are generated in the clock element 14. Element 14 may include a VCXO incorporated in a phase locked loop for phase locking the system clocks and the sampling clock to one of the QAM carriers.

The 15.36 MHz samples generated by the ADC 12 are applied to a low pass filter 16, having a pass band to attenuate the wideband (SP) QAM carrier, and pass the narrower (HP) QAM carrier. The lowpass filtered HP samples are applied to the circuit element 20, and to the subtrahend input port of a subtracter 18. The 15.36 MHz ADTV samples from the ADC 12 are applied to the minuend input port of the subtracter 18. The differences passed by the subtracter represent the SP portion of the ADTV signal, that is the combination of the lowpass filter 16 and the subtracter 18 provides a high or bandpass filter function which attenuates that part of the spectrum occupied by the HP signal component. The SP signal component provided by the subtracter 18 is also applied to the circuit element 20.

Element 20 demodulates the respective HP and SP QAM signals into their respective in-phase (I) and quadrature-phase (Q) components. It also time division multiplexes the in-phase phase components of the SP an HP signals, and time division multiplexes the quadrature-phase components of the SP and HP signals. The symbol rate of the SP signal is exactly four times the symbol rate of the HP signal. In addition the ADTV signal was sampled at four times the SP symbol rate (16 times the HP symbol rate) and the sampling instants are phase locked to the SP carrier. Therefore, alternate samples of the SP signal correspond to in-phase and quadrature-phase signal components. The SP signal may be separated to its in-phase and quadrature-phase components merely by parsing alternate samples into an I signal path and a Q signal path. The in-phase and quadrature-phase components of the HP signal may be separated by selecting every fourth sample from the HP sample stream, and then parsing alternate ones of these samples into an I signal path and a Q signal path.

For every I (or Q) sample in the separated HP signal, there are four I (or Q) samples in the separated SP signal. The SP I or Q samples occur at a 7.68 MHz rate and the HP I or Q samples occur at a 1.92 MHz rate. Element 20 time division multiplexes the I (Q) component samples at in the ratio of four SP samples to one HP sample, and couples the multiplexed I (Q) samples to a Nyquist or symbol shaping filter 22.

Figure 7:
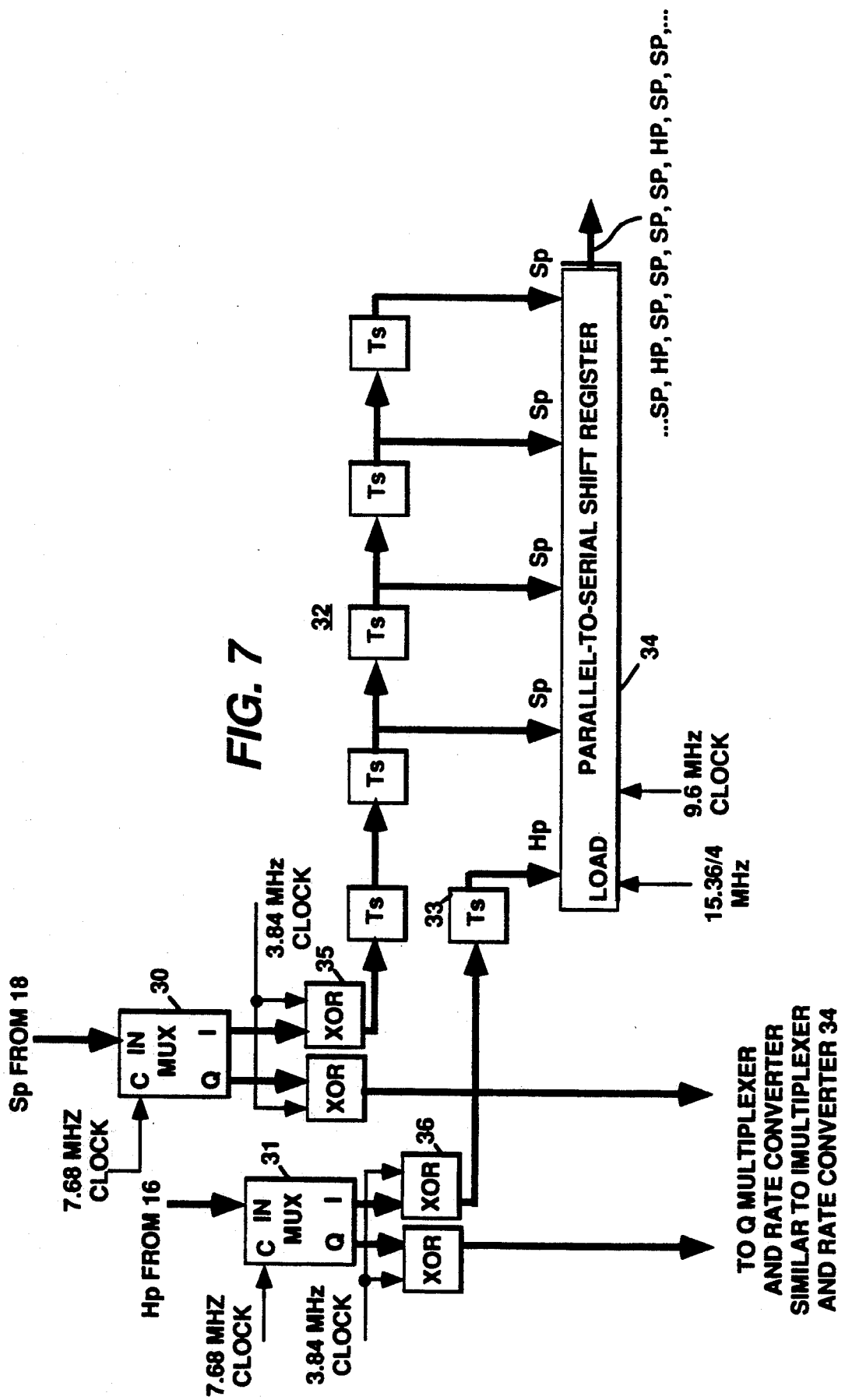
FIG. 7 is a block diagram of the I, Q DEMUX AND MUX element 20 of FIG. 3.

FIG. 7 illustrates exemplary circuitry for the element 20. In FIG. 7, the bandpass filtered SP signal from the subtracter 18 is applied to a one-to-two multiplexer 30, and the lowpass filtered HP signal is applied to the one-to-two multiplexer 31. Both the SP and HP signals occur at the 15.36 MHz rate. The control inputs C, of the respective multiplexers 30 and 31 are clocked at 7.68 MHz conditioning the multiplexers to couple alternate input samples to the I and Q output ports of the respective multiplexers, thus separating the I and Q components. Note, however, that even though the multiplexers 30 and 31 separate the I and Q components of the HP and SP signals, the I and Q signals are not demodulated as alternate samples correspond to 180 degree phases. Demodulation is performed by multiplying successive I samples and successive Q samples by 1, −1, 1, −1, 1, −1, 1, etc. This multiplication is performed by the exclusive OR gates XOR 35 and 36 which have first input ports coupled to receive the I and Q samples and second input ports coupled to a clock signal having a frequency of one half the output sample rate from the multiplexers.

Demodulation need not necessarily be performed at this point in the system. Whether it is or not affects the form of the succeeding filter functions. If demodulation is performed at this point, the following Nyquist filters will have lowpass transfer functions. Alternatively, if demodulation is performed after the Nyquist filters, then the Nyquist filters will have bandpass transfer functions.

The HP and SP in-phase components output from the respective multiplexers are at a 7.68 MHz rate. The SP I samples are coupled to a serial-input-parallel output shift register 32, which shifts samples at the 7.68 MHz rate. Successive output ports of the register 32 are coupled to the latter four input ports of a five-input parallel-input-serial-output shift register 34. The HP I samples are applied to a compensating delay stage 33 which shifts samples at the 7.68 MHz rate. Output samples from the stage 33 are applied to the fifth input port of the register 34. The load input of the register 34 is pulsed at a rate of 15.36/8 MHz to load a set of four successive SP and one HP I component samples. The register 34 is then clocked at 9.62 MHz to provide a serial stream of time division multiplexed SP and HP in-phase component samples. The quadrature-phase samples are separated and multiplexed in a similar manner with similar circuitry (not shown).

The demodulated and multiplexed I and Q samples, from element 20, are applied to square root Nyquist filters 22. The signal illustrated in FIG. 1 is transmitted with excess bandwidth, which bandwidth is tailored by Nyquist filters at the transmitter. In order to minimize signal noise at the receiver, the received signal is filtered with Nyquist filters having transfer functions substantially matched to the Nyquist filters incorporated at the transmitter. These filters are of the finite impulse response (FIR) type and typically have 30 or more taps and associated weighting circuits. Such filters are very hardware intensive. Arranging the filters to operate in time multiplexed fashion to process the time division multiplexed I and Q samples significantly reduces the required hardware.

Figure 4:
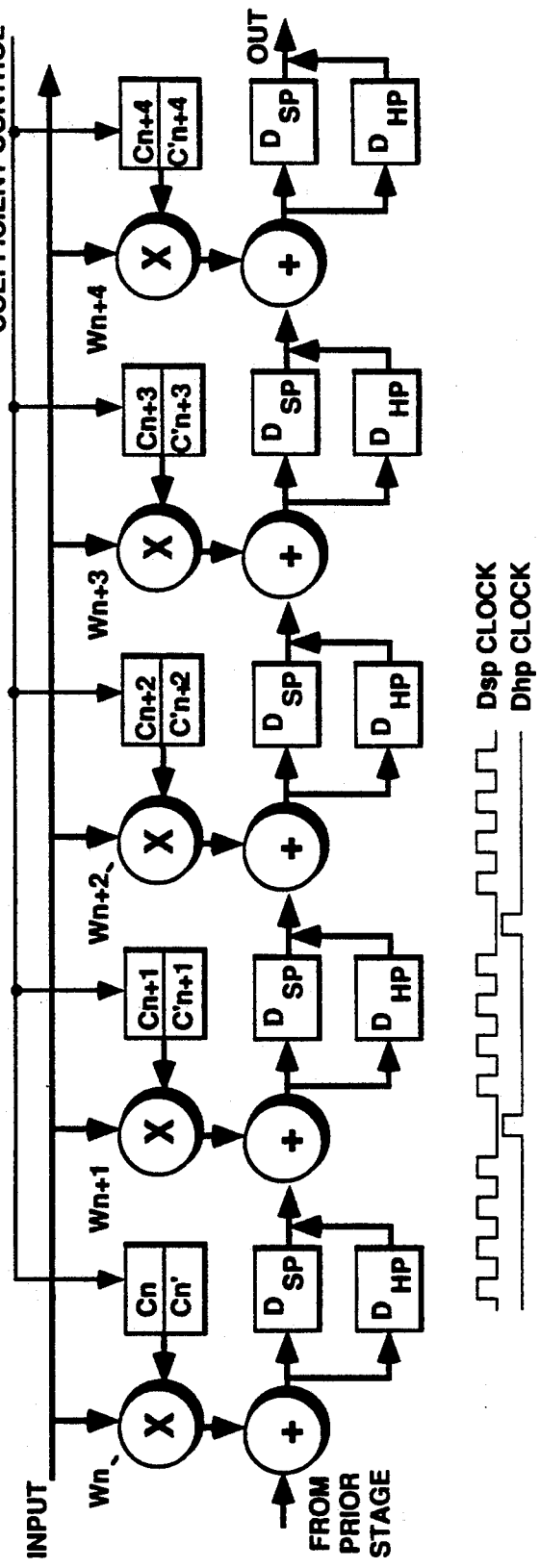
FIG. 4 is a block diagram of an FIR filter for the time division multiplexed filtering of two signals.

FIG. 4 illustrates in block form an example of a portion of one of the I and Q filters 22. The filter is arranged as an input weighted FIR filter. Assume that the time multiplexed I samples from the element 20 are applied to the bus designated INPUT. These samples are applied to each of the weighting circuits $W_{n+i}$ wherein they are weighted by respective coefficients $C_{n+i}$. The weighted samples from the respective weighting circuits are coupled to respective adders, which adders are interconnected by delay stages $D_{SP}$ ($D_{HP}$). The delay stages are clocked at the sample rate to successively process the applied samples, and provide a filtered signal at the output at the right end of the filter. Recall that the samples occur in the sequence SP, SP, SP, SP, HP, SP, SP, SP, SP, HP, etc. When an SP sample is applied to the input, the delay stages $D_{SP}$ are enabled or clocked, and when an HP sample is applied to the input the $D_{HP}$ delay stages are enabled or clocked. In this manner the SP (HP) samples are filtered independently of the HP (SP) samples. Each time a particular sample type SP (HP) is applied to the input, only those delay stages storing like type samples SP (HP) are interconnected between adder circuits forming a filter operative on only that type sample. That is, when SP (HP) samples are applied to the input, the $D_{HP}$ ($D_{SP}$) delay stages are effectively removed from the circuit (the information contained therein however is retained). The general timing of the two types of delay stages is shown in the FIGURE and labelled Dsp CLOCK and Dhp CLOCK for the sample sequence indicated above.

The system is illustrated with sources of weighting coefficients $C_{n+i}$ having two coefficients $C_{n+i}$ and $C'_{n+i}$, which applies to the general case for a time division multiplexed filter. In this instance the coefficients are switchable for the different types of samples, if desired. That is, the filter may be arranged to provide different transfer functions for the different signals by using alternate coefficients for the different signals. Thus, if the HP and SP signals are to be processed with different filter functions, for example, the set of coefficients $C_{n+i}$ ($C'_{n+i}$) will be applied to the weighting circuits $W_{n+i}$ when the HP (SP) samples are applied to the filter input. Switching of the coefficients is effected by the coefficient control signal (e.g., signal CB of FIG. 6).

Figure 5:
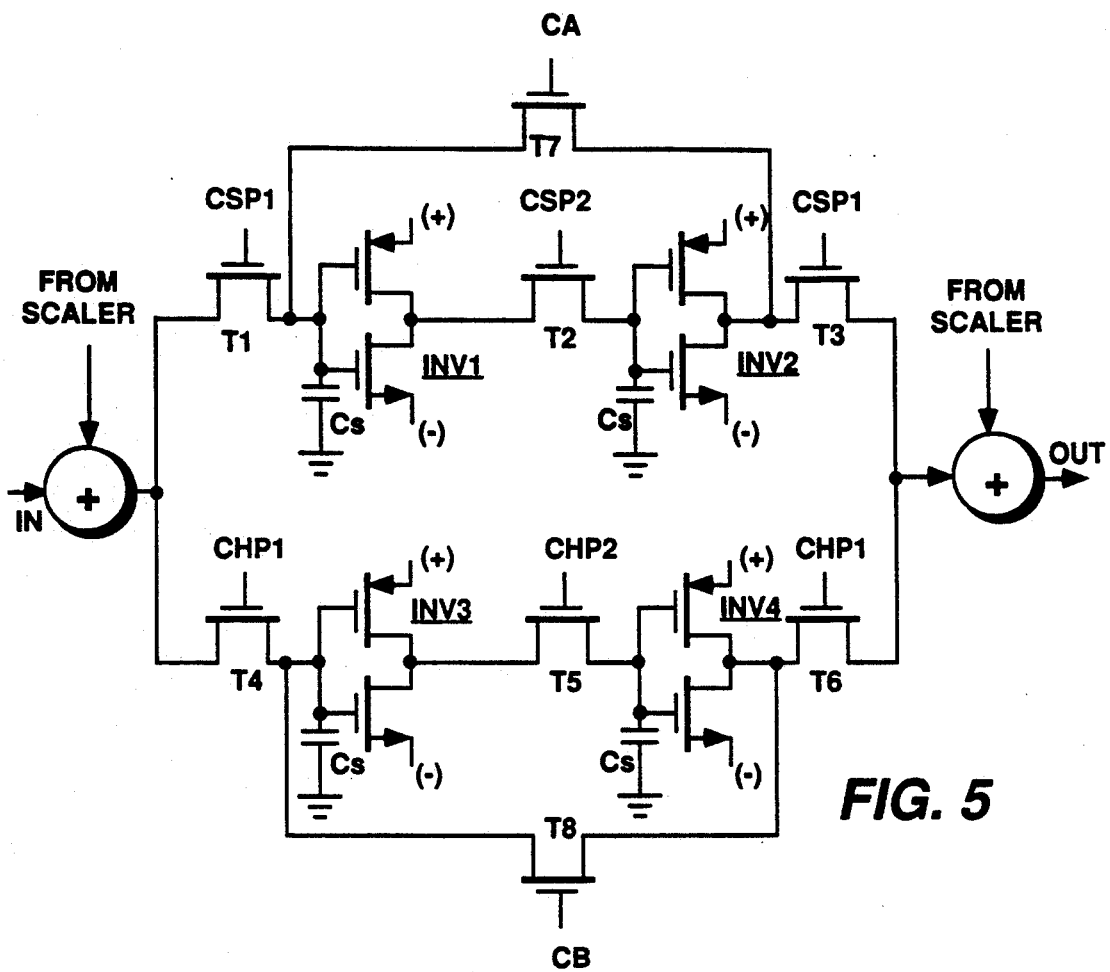
FIG. 5 is a schematic diagram of one stage of the filter of FIG. 4.
Figure 6:
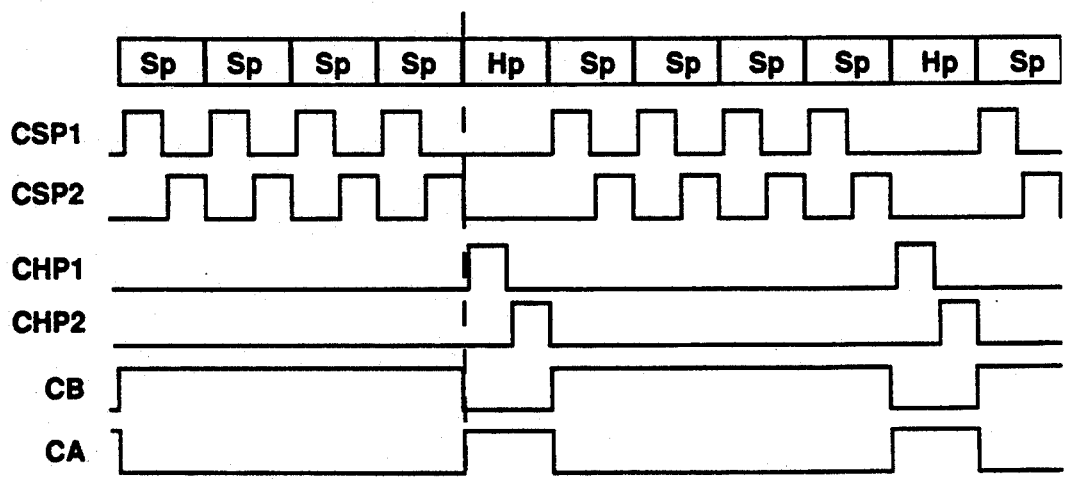
FIG. 6 is a timing diagram of respective clocking signals for operation of the circuitry of FIG. 5.

FIG. 5 illustrates in more detail exemplary circuitry which may be implemented for the delay stages $D_{SP}$ and $D_{HP}$. The circuitry shown is arranged to accommodate only one bit of the signal samples. In practice a number of such circuits, equal to the number of bits in the applied samples, will be arranged in parallel. Clock and/or control signal waveforms required to operate the FIG. 5 circuitry are illustrated in FIG. 6. In FIG. 6 the row of boxes designated SP, HP etc represent sample intervals and the respective sample type applied to the input of the filter during respective sample intervals.

In FIG. 5 the transistors T1, T2, T3, T7, and inverters INV1 and INV2 form the circuitry of one bit of the $D_{SP}$ delay stage, and the transistors T4, T5, T6, T8, and inverters INV3 and INV4 form the circuitry of one bit of the $D_{HP}$ delay stage. Clock signal CSP1 is applied to the transistors T1 and T3 to couple the SP signal samples to inverter INV1 from the preceding adder and to couple SP signal samples from inverter INV2 to the succeeding adder. The sample coupled to the inverter INV1 is stored on the stray capacitance Cs associated with the gate electrodes of the inverter INV1. The sample is retained on this gate capacitance when the transistor T1 is turned off. Antiphase clock CSP2 is applied to transistor T2 to condition T2 to couple the output of the inverter INV1 to the input of the inverter INV2. This occurs immediately after transistor T1 turns off. The sample value applied to the inverter INV2 is stored on the stray capacitance Cs associated with the gate electrodes of INV2. During the first half of a sample period n, INV2 is storing sample n−1 and provides sample n−1 to the output adder during the portion of sample period n that transistor T3 is conditioned to conduct by clock CSP1. Simultaneously sample n from the input adder is applied to the inverter INV1 via transistor T1. Transistors T1 and T3 are turned off at about the midpoint of sample period n with sample n being stored on the gate capacitance of INV1 and sample n−1 being output by INV2. During the second half of the sample interval n, transistor T2 is turned on, coupling the output potential of INV1 to the gate electrodes of INV2, at which time both the input to INV1 and the output of INV2 exhibit the same potential (corresponding to the state of sample n). Since the same potential occurs at the input of INV1 and the output of INV2, these points may be interconnected to retain the potential thereon indefinitely. However, in between successive sample periods it is not necessary to make such connection to retain the sample information, as the gate capacitances are sufficiently large to hold the values at the frequencies the samples occur. Transistor T7 is provided to make such connection, but in this example T7 is only conditioned to conduct during the sample periods that HP samples are applied to the filter. Note that when transistors T1 and T3 are conditioned to not conduct, the circuitry between transistors T1 and T3 is effectively removed from the system, however the data stored therein is not lost.

The circuitry of transistors T4 and T6 and the elements therebetween operate in a similar fashion except they are controlled by the clocks CHP1, CHP2 and CB, and as can be seen from FIG. 6 are arranged to operate when the opposite circuitry is idled.

Referring again to FIG. 3, the output of the Nyquist filter 22 is applied to an element 24 which may include an equalizer and/or a deghoster. These functions may be performed on the time division multiplexed signals from the filter 22. In an embodiment of this type, the equalizer and deghoster may be provided a reference basis corresponding to the time division multiplexed signal for generating appropriate coefficients for the correcting filters. Since such a deghoster and/or equalizer are trained with reference to a time multiplexed signal, they may take any of the known configurations. Alternatively, the HP and LP samples may be demultiplexed and applied to independent parallel equalizer and deghoster circuits, before being coupled to decompression circuitry.

Figure 8:
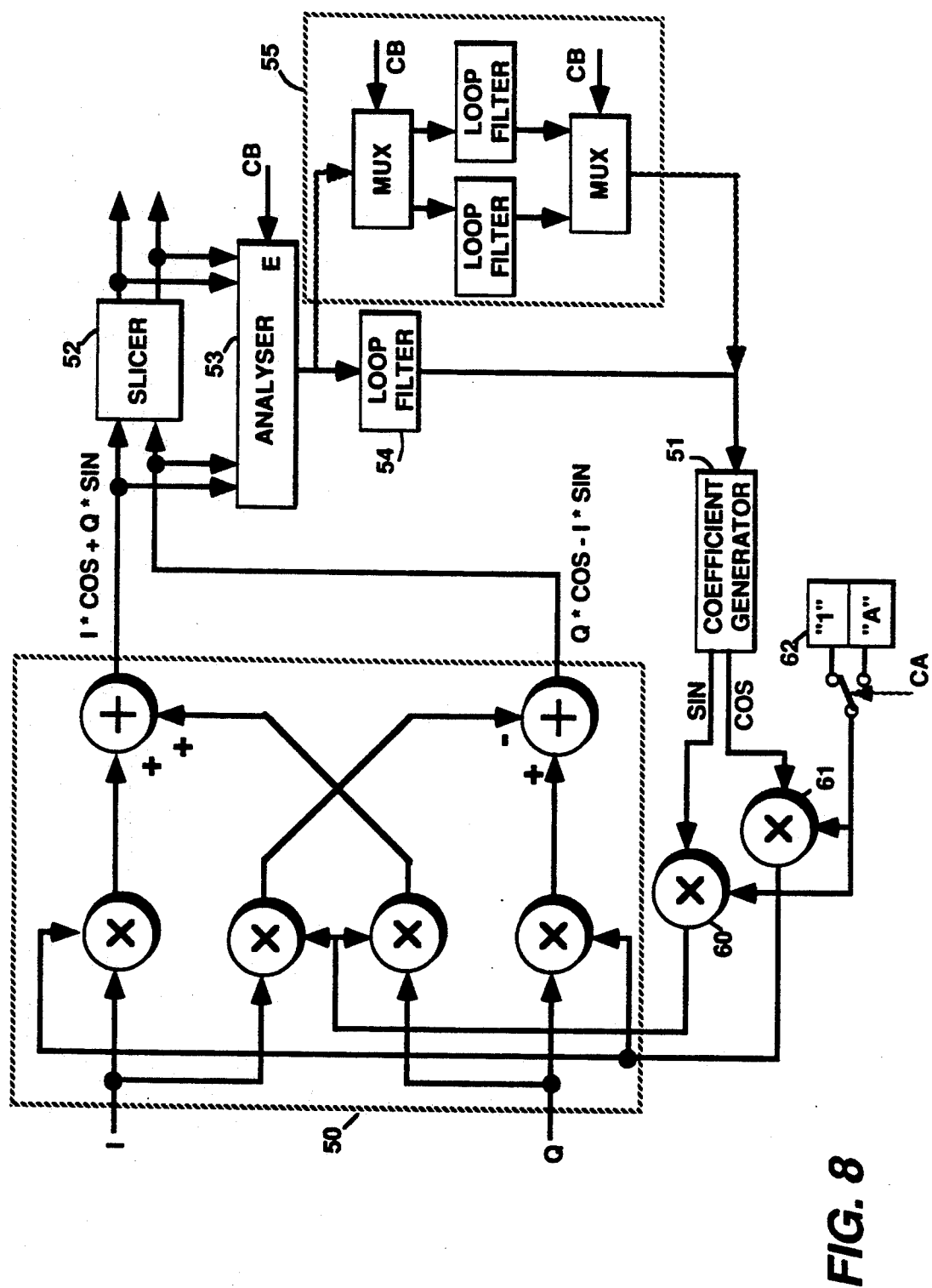
FIG. 8 is a block diagram of an adaptive time division multiplexed phase correction circuit which may be implemented in the element 24 of FIG. 3.

Typically the input to circuitry such as contained in element 24 will include further correction circuitry to compensate for phase errors in the sampling clock applied to the ADC 12. If the sampling clock applied to the ADC is not precisely phase locked to the QAM carrier, then the I and Q samples provided by the element 20 will contain errors even though they correspond to true quadrature components (though different from the desired quadrature components). The further correction circuitry is conventionally called a rotator or derotator. It can be shown that any set of quadrature signals can be rotated to a desired angular position by performing a complex multiplication on the quadrature signals, i.e., quadrature signals I and Q can be rotated to conform to corrected quadrature signals I' and Q' according to the relation $$I' = I\cos(\phi) + Q\sin(\phi)$$

$$Q' = Q\cos(\phi) - I\sin(\phi)$$

where $\phi$ corresponds to the correction angle. Circuitry to perform this correction is in general well known, and is illustrated in FIG. 8. The time multiplexed I and Q samples are applied to respective input ports of a complex multiplier 50. Correction coefficients (COS, SIN) from a coefficient generator 51 are applied to a second set of input ports of the multiplier 50. Complex products generated by the multiplier 50 are applied to a slicer 52 and an analyzer 53. Output signals from the slicer 52 are also applied to the analyzer which generates a phase error signal responsive to the signals occurring before and after application to the slicer. The phase error signal is integrated in the loop filter 54, and thereafter coupled to the coefficient generator 51 which may be a read only memory (ROM) programmed to provide appropriate correction factors commensurate with the current phase errors. For a more detailed description of this type of apparatus the reader is referred to the text *DIGITAL COMMUNICATIONS*, by Lee and Messerschmitt (Kluwer Academic Publishers, Boston, Mass., U.S.A., 1988).

In a system where the applied signals are time division multiplexed certain adjustments must be made. Nominally both the SP and HP samples will be multiplied by the same coefficients, since they incurred the same sampling phase errors. However the calculations of the correction coefficients are complicated by the time multiplexed signals. One method of generating the appropriate coefficients is to disable the analyzer 53 on the occurrence of HP samples and perform the phase analysis on only the SP samples. This is indicated in FIG. 8 by the application of the clock signal CB (FIG. 6) to the enable (E) input of the analyzer 53. Since the SP samples occur 80 percent of the time and are continuous over sets of four samples, fairly accurate error calculations may be made. The negative aspect of this method is a slight addition to the time required for convergence.

A second method of calculating phase errors for the time multiplexed signals is to generate independent error values for the HP and SP samples. Assuming that there is no delay incurred in the slicer 52, independent error values may be generated by providing parallel loop filters and directing the SP errors provided by the analyzer 53 to one loop filter and the HP errors to a second loop filter. The outputs provided by the respective loop filters may then be selectively applied to the coefficient generator 51 synchronous with the occurrence of HP and SP samples. Exemplary apparatus to provide independent error signals to the coefficient generator 51 is illustrated in the block 55. If the block 55 is incorporated into the system, the analyzer 53 will be continuously enabled rather than selectively enabled by the signal CB. The signal CB may however be employed to selectively operate the multiplexing circuitry in the block 55.

Another further alternative is to generate weighted averages of the independent error signals for generating common correction coefficients for application to both signal components.

In practically any digital signal processing system it is desirable to utilize the entire available dynamic range of the processing elements. That is, the processing elements should be designed to accommodate the dynamic range of the input signal to be processed. However, in a time division multiplexed system which is arranged to process a signal of the form shown in FIG. 1, where one of the QAM signals (narrowband) is transmitted with greater amplitude (power) than the other (wideband), if the system is designed to handle the dynamic range of the narrowband signal, such system will not utilize its full dynamic range when processing the wideband signal.

The FIG. 8 apparatus is arranged to normalize (or equalize) one of the time division multiplexed components with respect to the other component. This is accomplished by the incorporation of the multipliers 60, 61, between the coefficient generator 51 and the complex multiplier 50. Assume that one of the multiplexed signal components is transmitted with an amplitude "A" times as large as the other. The amplitude of the smaller component can be normalized to the amplitude of the larger component by multiplying the correction coefficients (cos ($\phi$), sin ($\phi$)) by the factor "A", before applying them to the complex multiplier. Since the correction coefficients (cos ($\phi$), sin ($\phi$)) contain only phase information, multiplying these coefficients by a constant "A" will not affect the phase correction performed by the complex multiplier 50, but will effect a gain control function on the processed signal. (Alternatively the larger signal could be 1/A times the correction coefficients.)

In FIG. 8 a source 62 provides the values "1" and "A" (A a normalizing value), which are coupled to respective poles of a switch. The output of the switch is coupled to the multiplier input ports of the multipliers 60 and 61. During the occurrence samples of one of the multiplexed signal components to the complex multiplier 50, the switch, responsive to the clock signal e.g., CA, applies the value "A" to the multipliers 60 and 61, and during occurrences of samples of the other multiplexed signal component, the switch applies the "1" value to the multipliers 60 and 61. In this manner the amplitudes of the two multiplexed signal components are normalized relative to each other.

Where respective QAM signal components are normalized in the multiplexed signal, as in the FIG. 8 arrangement, error signals may be generated directly from both components of the multiplexed signal, that is the selective generation of separate error signals may be obviated.

What is claimed is:

1. Apparatus for processing a transmitted signal including first and second QAM signals conveyed in a single channel, comprising:
    means for receiving/detecting said transmitted signal including said first and second QAM signals;
    means responsive to the first and second QAM signals, for deriving respective in-phase and quadrature-phase components of said first and second QAM signals;
    means for time division multiplexing the in-phase components of the first and second QAM signals, and for time division multiplexing the quadrature-phase components of the first and second QAM signals; and
    complex phase correction apparatus responsive to said time division multiplexed signals for correcting frequency and phase errors incurred during signal transmission or reception/detection.

2. The apparatus set forth in claim 1 wherein said phase correction apparatus comprises:
    a complex multiplier having first and second multiplicand signal input ports respectively coupled to receive the time division multiplexed quadrature-phase components and the time division multiplexed in-phase components, having first and second multiplier input ports and having first and second output ports for providing phase/frequency corrected time division multiplexed in-phase and quadrature-phase components respectively;
    processing apparatus coupled to said first and second output ports for generating phase error signals representative of differences between the carrier phase of QAM signals before conveyance and after reception;
    means, responsive to said phase error signals, for generating first and second complex phase correction signals for correcting phase errors of said time division multiplexed in-phase and quadrature-phase signals; and
    means for coupling said first and second complex correction signals to the first and second multiplier input ports of the complex multiplier.

3. The apparatus set forth in claim 2 wherein said means for coupling said first and second complex phase correction signals to the first and second multiplier input ports of the complex multiplier comprises:
    a source of an amplitude normalizing value;
    means for selectively multiplying said first and second complex phase correction signals by said normalizing value when components of said first QAM signal are applied to said complex multiplier and not multiplying said first and second complex phase correction signals by said normalizing value when components of said second QAM signal are applied to said complex multiplier.

4. The apparatus set forth in claim 2 wherein said processing apparatus for generating phase error signals is conditioned to generate phase error signals from components of said first QAM signal to the exclusion of components of said second QAM signal.

5. The apparatus set forth in claim 2 wherein said processing apparatus for generating phase error signals is conditioned to generate first phase error signals from components of said first QAM signal to the exclusion of said second QAM signal and to generate second phase error signals from components of said second QAM signal to the exclusion of said first QAM signal, and said first and second phase error signals are selectively applied to said means for generating complex phase correction signals when said first and second QAM signal components are applied to the complex multiplier respectively.

6. A high definition television receiver for receiving and processing signal transmitted as a plurality of QAM signals in a single channel, said receiver comprising:
  means responsive to said transmitted signal for sampling said transmitted signal and separating the in-phase and quadrature-phase components of at least two of said plurality of QAM signals;
  means for generating a time division multiplexed signal of said in-phase components of said at least two of said plurality of QAM signals, and for generating a time division multiplexed signal of said quadrature-phase components of said at least two of said plurality of QAM signals;
  complex equalizer means responsive to said time division multiplexed in-phase signal and said time division multiplexed quadrature-phase signal, for reducing phase errors incurred in sampling said transmitted signal; and
  utilization means for conditioning processed signal for storage or display.

7. The high definition television receiver set forth in claim 6 wherein said equalizer means includes;
  a complex multiplier having first and second multiplicand input ports coupled to receive said time division multiplexed in-phase signal and said time division multiplexed quadrature-phase signal respectively, having first and second multiplier input ports, and having first and second output ports;
  analyzer means coupled to said first and second output ports for detecting phase errors in the time division multiplexed samples and generating an error signal; and
  means responsive to said error signal for generating complex phase correction signals and coupling said correction signals to said multiplier input ports.

8. The high definition television receiver set forth in claim 7 wherein said equalizer means further includes means for conditioning said analyzer means to be responsive to the in-phase and quadrature-phase components of only one of said QAM signals.

9. The high definition television receiver set forth in claim 7 wherein said equalizer means further includes means for conditioning said analyzer means to provide a time division multiplexed error signal wherein the time division multiplexed error signal components correspond to respective QAM signals.

* * * * *